(12) United States Patent
Brouwer et al.

(10) Patent No.: US 7,016,474 B2
(45) Date of Patent: Mar. 21, 2006

(54) REDUCED COST DIGITAL SUBSCRIBER LINE (DSL) INTERFACE ARRANGEMENT

(75) Inventors: Wim L. Brouwer, North Aurora, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 402 days.

(21) Appl. No.: 10/140,425

(22) Filed: May 6, 2002

(65) Prior Publication Data

US 2003/0206615 A1 Nov. 6, 2003

(51) Int. Cl.
*H04M 3/22* (2006.01)
(52) U.S. Cl. .................. 379/29.01; 379/29.11
(58) Field of Classification Search ............... 379/1.01, 379/29.01, 29.11, 413.02, 26.01, 27.01, 29.05
See application file for complete search history.

(56) References Cited

U.S. PATENT DOCUMENTS 6,831,930 B1 * 12/2004 Swam ........................ 370/535

* cited by examiner

*Primary Examiner*—Barry Taylor

(57) ABSTRACT

Improved arrangement for interfacing between a Digital Subscriber Line (DSL), and a telephone network and data network. A Low-Pass Filter is mounted together with a POTS (Plain Old Telephone Service) interface circuit to reduce the number of connections to a Main Distributing Frame (MDF). Other arrangements are disclosed for mounting blocking capacitors to isolate a data network test access from the POTS service provision. Advantageously, reliable DSL service is provided at lower operations and apparatus cost.

4 Claims, 6 Drawing Sheets

REDUCED COST DIGITAL SUBSCRIBER LINE (DSL) INTERFACE ARRANGEMENT

RELATED APPLICATION

This application is related to patent application Ser. No. 09/617,446: "A DSL Compatabile POTS Line Card", filed Jul. 17, 2000, by R. A. Nordin, C. R. Posthuma, and P. R. Sand, and assigned to the Assignee of this Application.

TECHNICAL FIELD

This invention relates to circuit arrangements for interfacing Digital Subscriber Lines (DSLs) with telephone switches and data switches.

PROBLEM

FIGS. 1 and 2 show the arrangements in the prior art for interfacing between telephone and data switches, and a Digital Subscriber Line (DSL). A DSL line is used to provide customers with conventional telephone service (Plain Old Telephone Service (POTS), and high speed data service over a single line. A DSL line is connected to the Public Switched Telephone Network (1) and a data network, such as ATM (Asynchronous Transfer Mode) Data Network (11). The Public Switched Telephone Network (PSTN) terminates on a Telephone Interface Line Card (2), of the type used for interfacing with conventional analog telephones (Plain Old Telephone Service) POTS, while the ATM network terminates on an ATM Termination Unit-Central Office Circuit (ATU-C) (20), comprising a modem (21) and a series capacitor (22). The series capacitor (22) provides DC isolation between the broadband test access (12) and the modem (21) and the data network (11). The Telephone Terminating Card (2) and the ATM Terminating Card (20) are both connected via the office side (50) of a Main Distributing Frame to a Splitter (25). The Splitter includes a Low-Pass Filter (27) in series with the Telephone Interface Card, and a Capacitor (26) in series with the ATM Interface Card. One reason for having an additional capacitor (26) in series with the capacitor of the ATM Interface Card (20) is to make it possible to have broadband access which is isolated on a DC basis from the POTS Service, thus preventing troubles, (e.g., a short circuit) from being introduced into the high reliability POTS service from the broadband test facility. Further, this DC isolation prevents a data carrier from illegally tapping the DSL subscriber's telephone conversations, or obtaining information about POTS traffic originated by or terminated to the DSL subscriber. Further, it prevents the data carrier from illegally testing the DSL line in the POTS band (DC to 4000 Hz). The output of the Splitter is connected to a Jumper (53) on the Main Distributing Frame to a Customer Line (30), which terminates at Customer Premises Equipment (CPE). There, a Low-Pass Filter (41) is inserted in series with the Line, and is connected to a Telephone Station (40), and a High Frequency DSL Interface (ADSL Terminating Unit Remote (ATU-R)) (35) comprising a series capacitor to block the low frequencies that are used by Telephone Station (40), and a modem. Circuit (35) is connected, for example, to a (PC) Personal Computer (36).

The arrangement of FIG. 2 is similar to the arrangement of FIG. 1, except that the Splitter (25) is directly connected to the ATU-C (20), within a single housing, instead of being connected via the Main Distributing Frame, as in FIG. 1. The arrangements of FIGS. 1 and 2 are used commercially today. As will be seen in the discussion of the Solution, these arrangements are expensive and complex.

SOLUTION

Less expensive arrangements are available as described in FIGS. 3–6. These arrangements, which represent an advance over the teachings of the prior art, include the following: by incorporating the Low-Pass Filter into the PSTN Interface Circuit, (FIGS. 3–6), the cost of the combination POTS Interface (2) Low-Pass Filter (54) is substantially reduced over the costs of housing this Filter in a separate Splitter Circuit.

Effectively, the Low-Pass Filter can be mounted on an enhanced PSTN Interface Card, thereby reducing the mounting costs for housing the Low-Pass Filter. The other element of the Splitter, Capacitor (26), is placed in series with the Data System Interface Circuit, and joins the output of the enhanced PSTN Interface Circuit at one point on the MDF. Thus, the number of points on the MDF required to provide the service is reduced.

In one alternative embodiment of Applicants' invention as illustrated in FIG. 3, a group of capacitors (C2) (26), are mounted as a unit and connected to a group of data interface circuits, thus providing a relatively inexpensive arrangement for mounting these capacitors. Advantageously, this arrangement has substantially lower equipment and administrative costs than the arrangement of FIG. 3.

In one alternative embodiment (FIG. 4), capacitor (26) is mounted together with Low Pass Filter (27) and POTS interface circuit (2). While this arrangement requires an extra connection to MDF (50), the equipment mounting cost is substantially reduced.

In another alternative embodiment (FIG. 5), capacitors (22) and (26) are both mounted in the ATU-C with modem (21). This reduces the mounting costs of Capacitor (26), and, compared to the arrangement of FIG. 4, eliminates one of the MDF connections, but does require that the broadband test access (12) be connected at a point other than the input to the ATU-C.

In another alternative embodiment (FIG. 6), the data interface circuit is modified to include a single Capacitor (23), whose capacitance is equivalent to the series of capacitance of Capacitors (22) and (26). The disadvantage of using this single capacitor is that the Broadband Test Access Line (12) is not isolated at the DC Level from the DSL facility (30). If this is not a concern for the PSTN carrier, then this arrangement is less expensive because there is no need for a separate Capacitor (26), (major reason), and the size of Capacitor (23) is actually smaller than the size of the original capacitor (22) in the Data Interface Circuit.

BRIEF DESCRIPTION OF THE DRAWING(S)

DETAILED DESCRIPTION

Applicants have found a number of ways of reducing equipment and operational costs for the interface between a DSL line and the Public Switched Telephone Network (PSTN) (1), and a data network, such as ATM Network (11).

Figure 1:
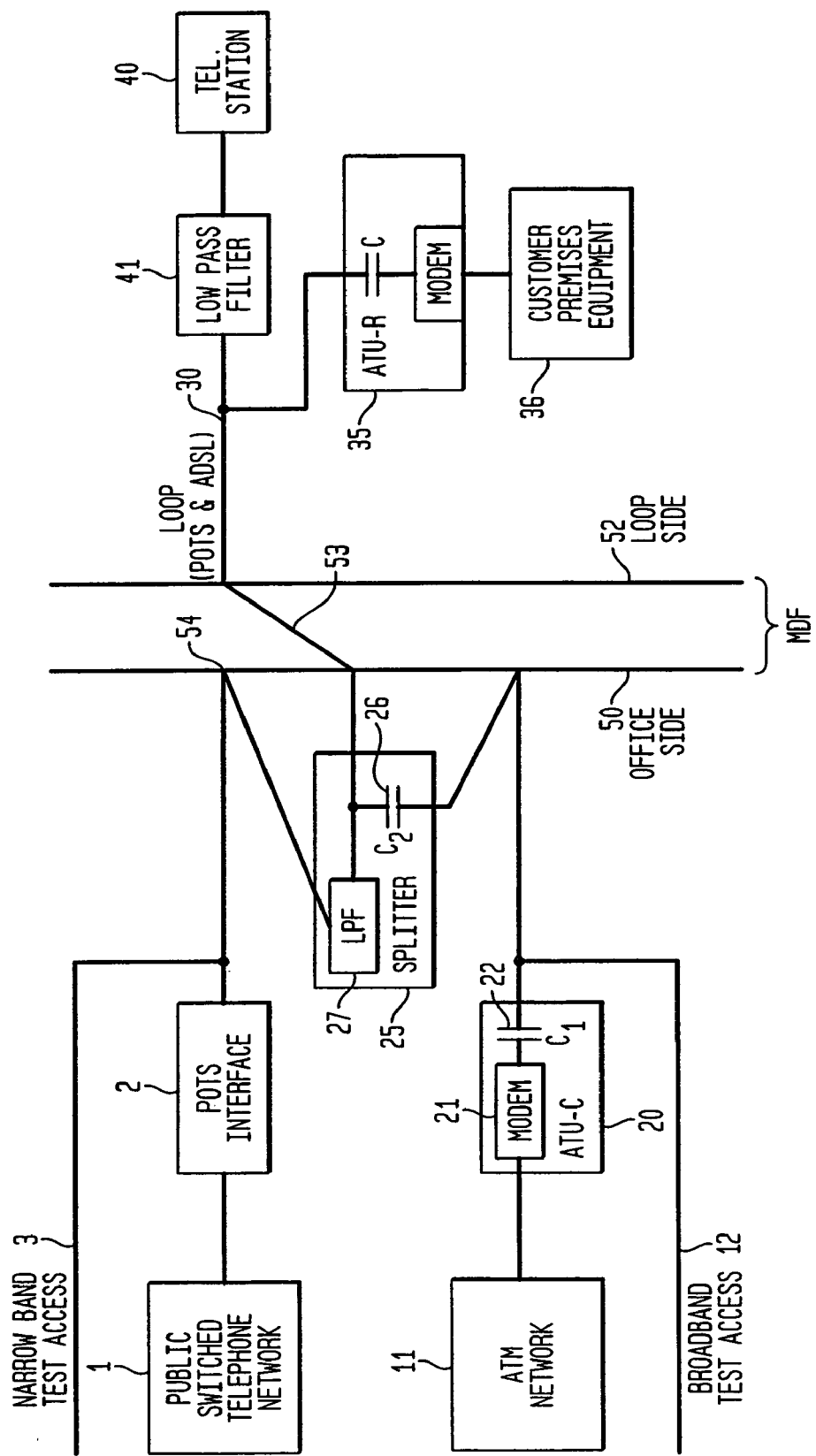
FIGS. 1 and 2 show arrangements for interfacing a telephone switch network and a data network to a DSL facility, as taught in the prior art.
Figure 2:
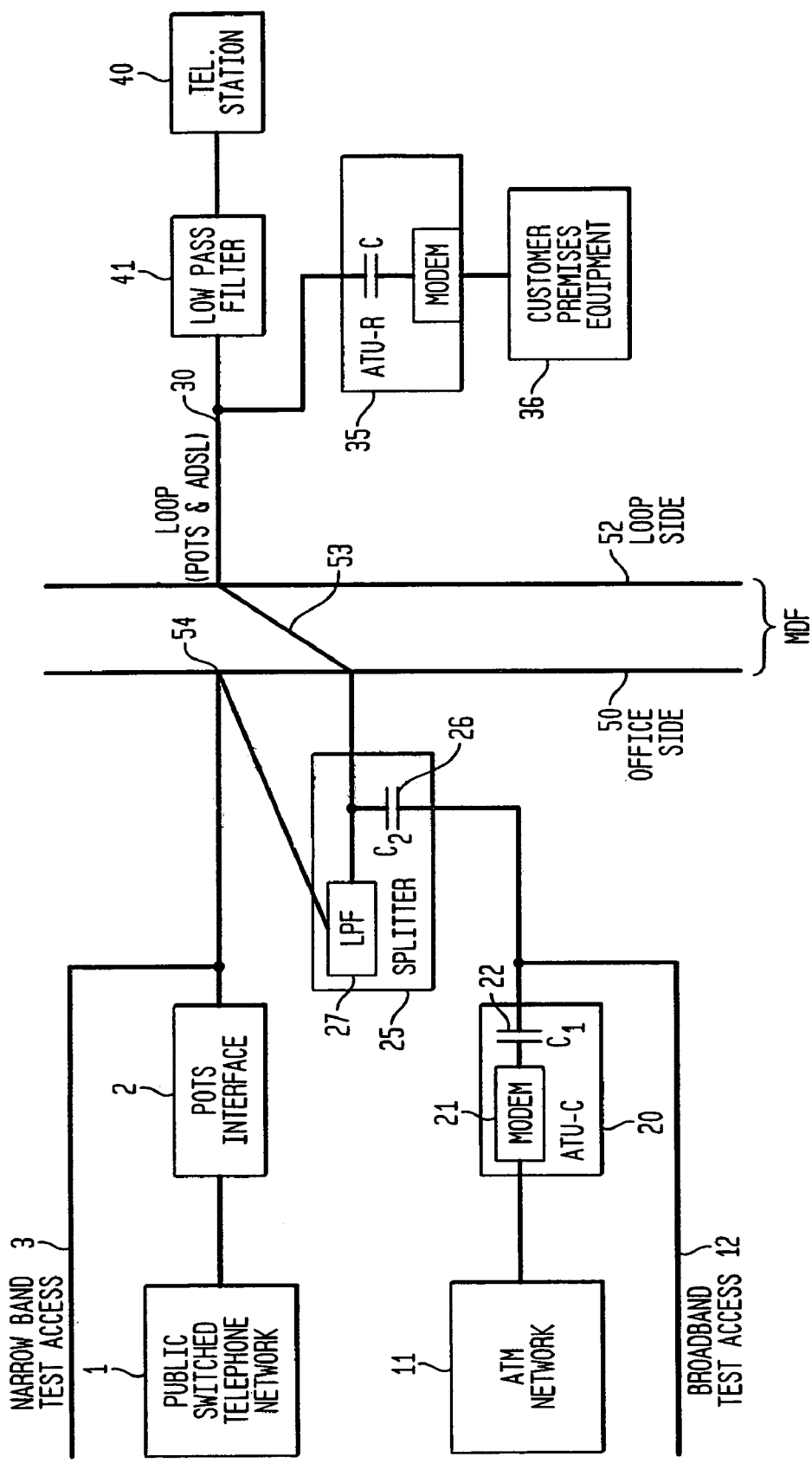
Figure 3:
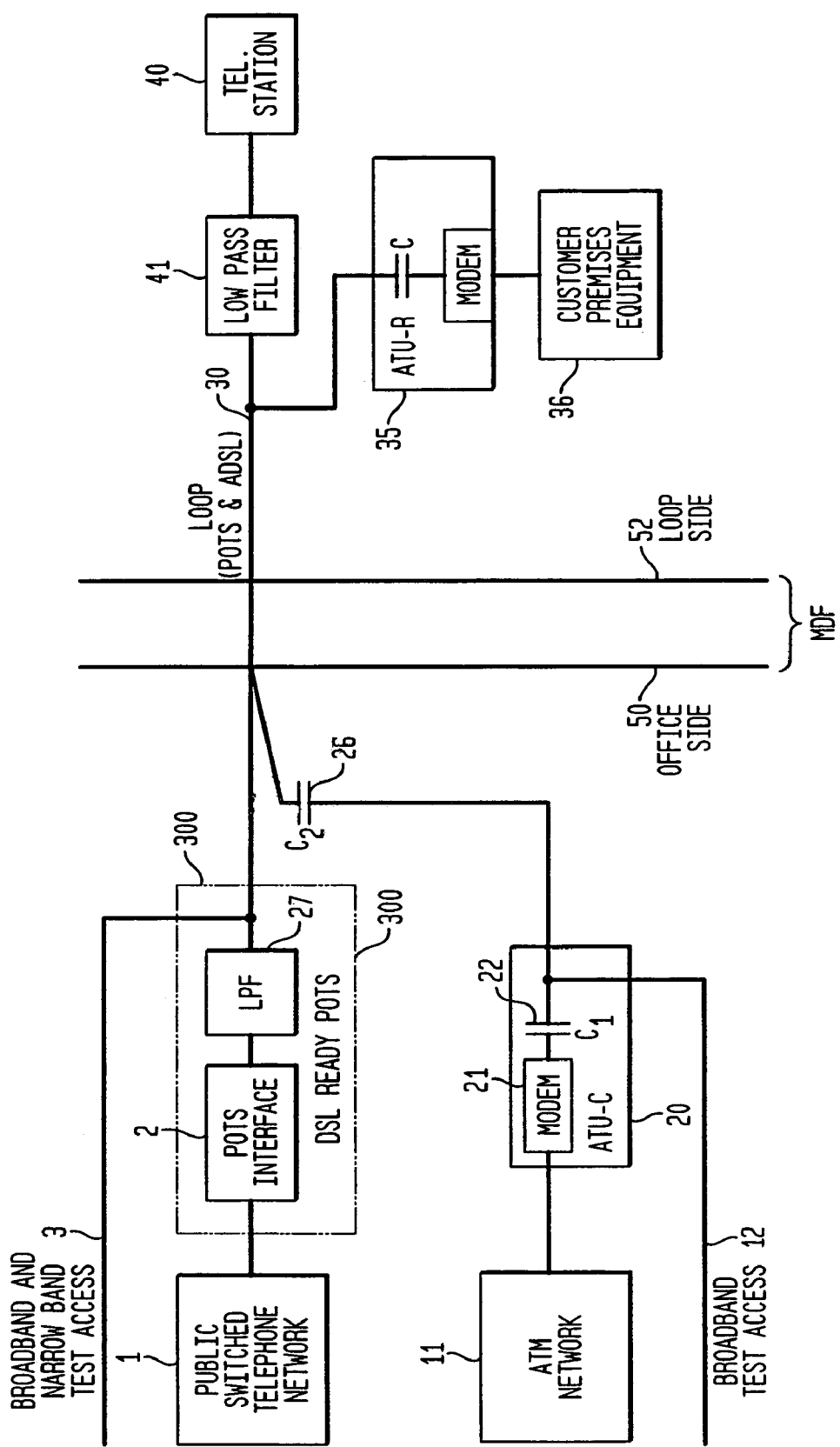
FIGS. 3–6 show four arrangements in accordance with the teachings of Applicants' invention for providing an interface at lower equipment and operational costs.

The embodiment illustrated in FIG. 3 mounts the Low-Pass Filter (27) in the same housing (300) as the POTS Interface (2). Only a single connection is required between the DSL Line (30) and various circuits for providing interfaces to the PSTN and the data network. From a single point on the Main Distributing Frame, the ATU-C (20) is connected via capacitor (26) and a direct connection is made to the housing (300) which contains POTS interface circuit (2), and Low-Pass Filter at (27). The broadband test access is provided, as in the case of the system illustrated in FIG. 1, at the junction of capacitors (26) and (22). Advantageously, by combining in a single unit the POTS interface circuit (2) and the Low-Pass Filter (27), and by separating capacitor (26) from other units, only a single MDF connection is required. Further, by combining the POTS interface circuit (2), and the Low-Pass Filter (27) in a single housing, apparatus costs are substantially reduced. Capacitor (26) can be located, for example, in the cable connecting the ATU-C (20) with the MDF.

In an alternative embodiment, groups of capacitors (26) can be separately mounted in a housing connected by a cable, which is connected on the one side to a plurality of ATU-C(s) (20), and on the other side, to the MDF. Advantageously, this type of arrangement can further reduce apparatus mounting costs.

Figure 4:
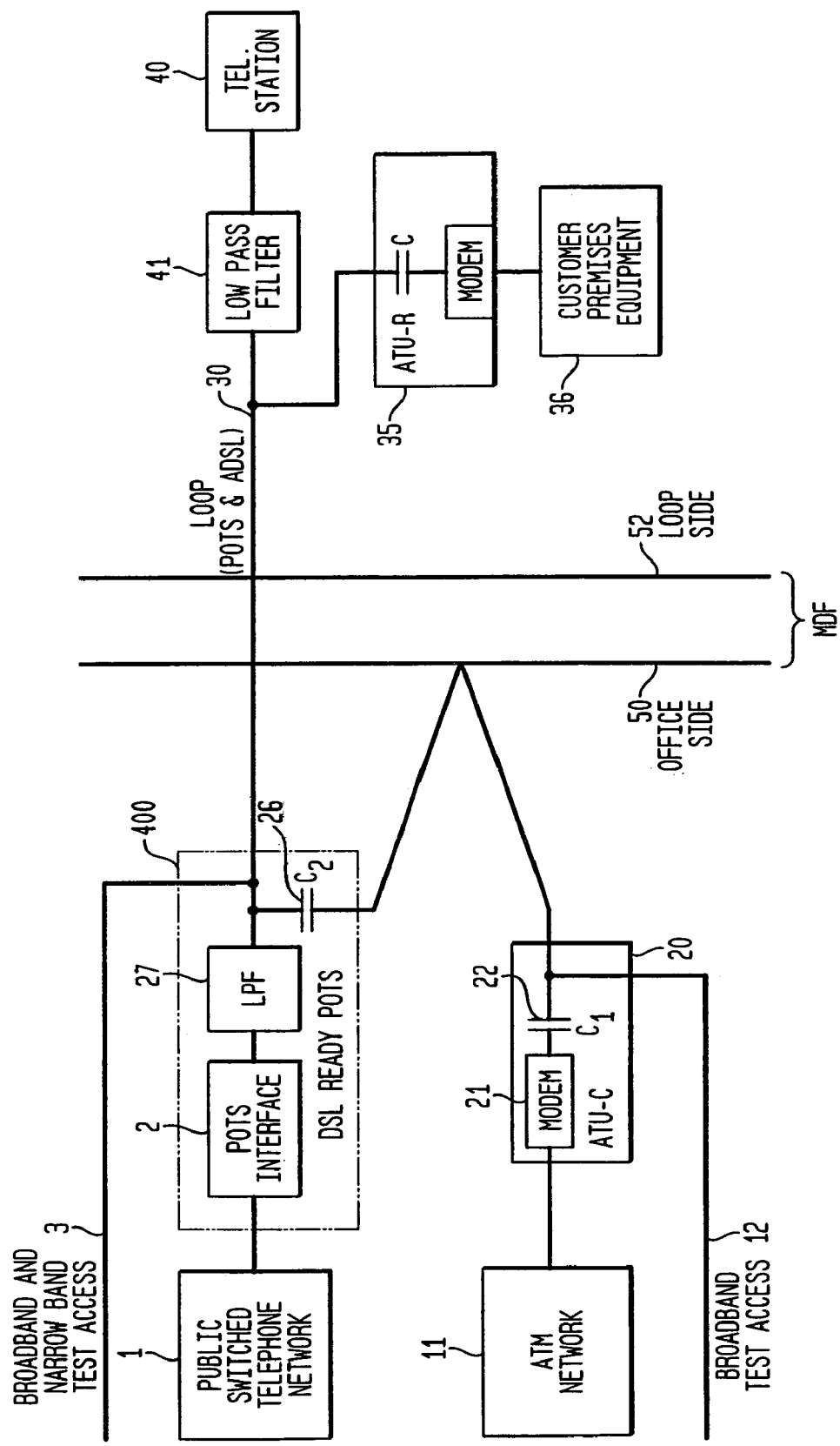

The arrangement of FIG. 4 is similar to that of FIG. 3, except that in FIG. 4, capacitor (26) is mounted in the same housing (400) as the POTS interface circuit (2), and the Low-Pass Filter (27). This provides an inexpensive way of mounting capacitor (26), but requires that a separate connection through the MDF is required to connect DSL line (30) to ATU-C (20).

Figure 5:
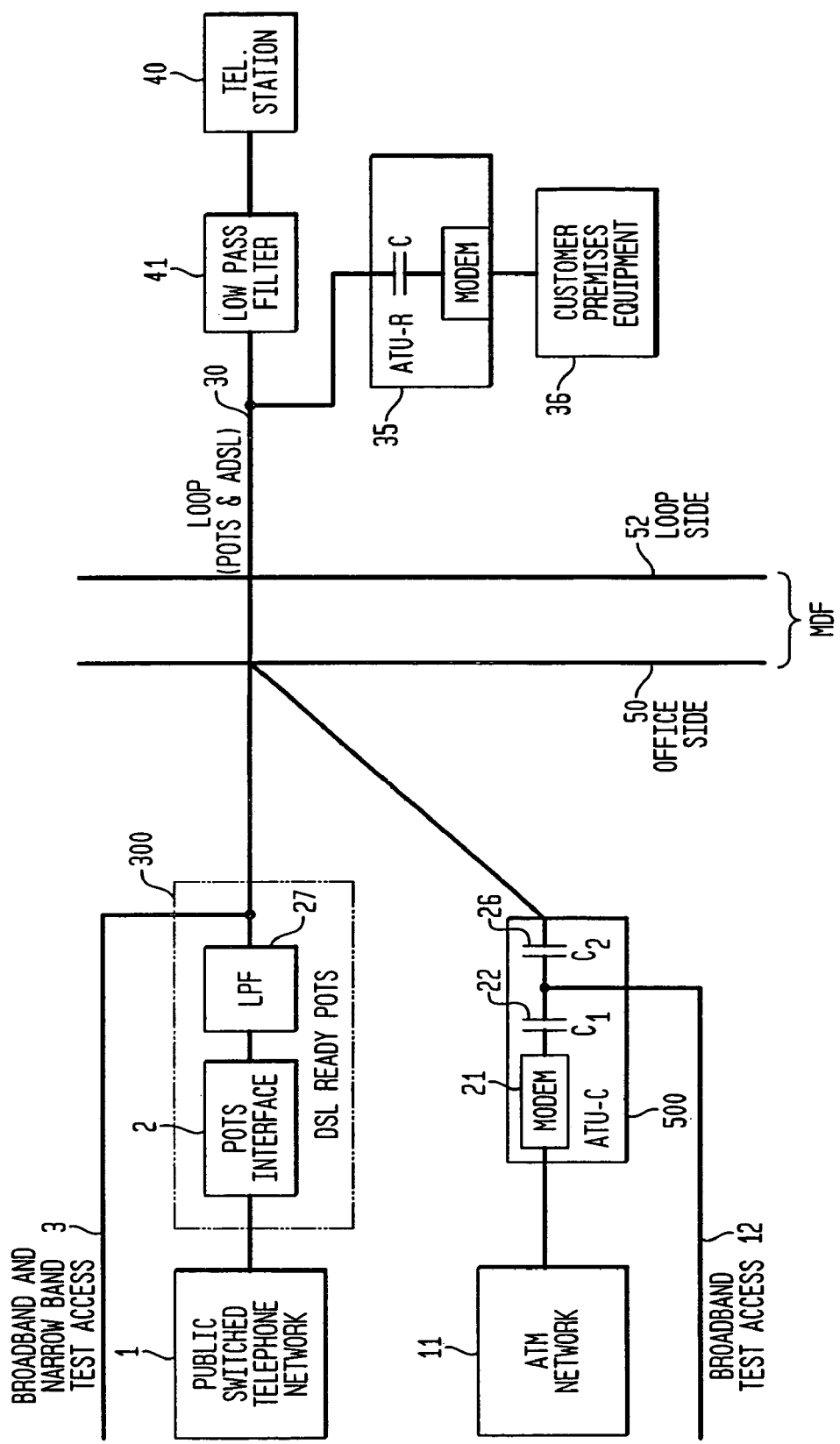

In the arrangement of FIG. 5, the ATU-C contains both capacitor (22) and capacitor (26), and the broadband test access is connected between these two capacitors within the ATU-C (500). This permits a single connection from the DSL line to both the POTS interface system (300), and the broadband interface system (500). This further minimizes the cost of mounting capacitor (26), but does require that the external connection to the broadband test access be from a point other than the end put to ATU-C (500).

Figure 6:
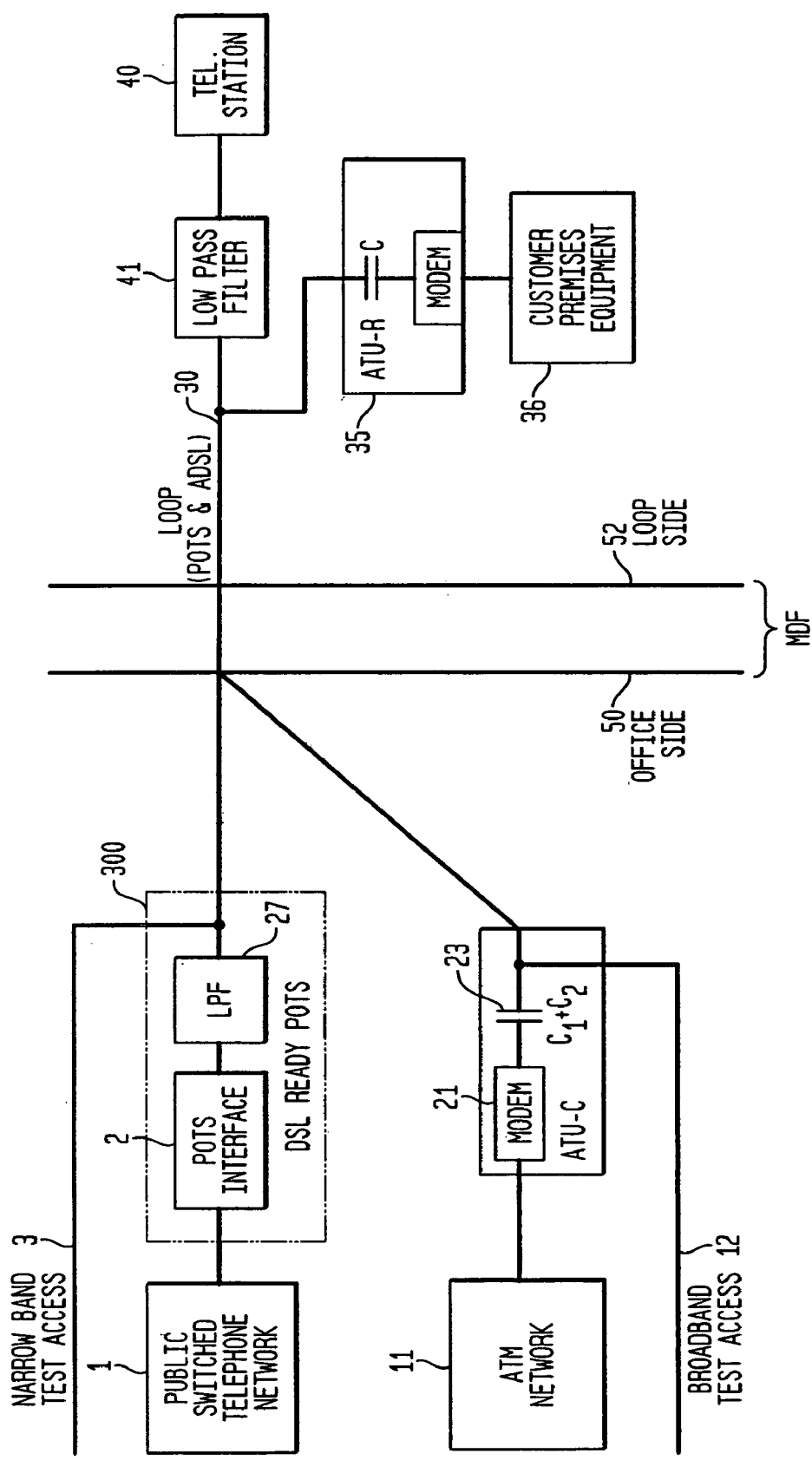

The arrangement of FIG. 6 is identical to that of FIG. 5, except that capacitors (22) and (26) have been combined into single capacitor (23) mounted in ATU-C (600). However, with the arrangement of FIG. 6, the broadband access is not isolated on a DC basis from the POTS interface (300). Individual telephone administrations may decide that this DC isolation is not required and that POTS service is adequately protected from interference by the broadband access system without a blocking capacitor such as capacitor (26).

Advantageously, all of the arrangements described in FIGS. 3–6 provide arrangements which are significantly cheaper, both in terms of operations costs (e.g., MDF connections), and apparatus costs (costs of mounting separate capacitors or in the case of FIG. 6, reducing the number of elements).

Advantageously, all of the arrangements illustrated in FIGS. 3–6 can use components available for providing DSL service using the techniques of the prior art.

The above arrangements disclose four preferred embodiments of Applicants' invention. Other arrangements will be apparent to those of ordinary skill in the art. Applicants' invention is limited only by the attached claims.

What is claimed is:

1. A circuit for interfacing between a DSL (Digital Subscriber Line), and a Public Switched Telephone Network (PSTN) and a Data Network, comprising:

a telephone network interface circuit comprising a POTS (Plain Old Telephone Service) Line Card and a Low-Pass Filter; and a data network interface circuit, comprising a modem and a series capacitor;

wherein both the telephone network interface circuit and the data network interface circuit are connected to one point on a main distributing frame;

wherein a test access facility is connectable to said one point;

wherein a blocking capacitor is inserted in the connection between the Data Network interface circuit and the Main Distributing Frame;

wherein a broadband test access facility is connectable between said blocking capacitor and said data network interface circuit;

wherein direct current signals and POTS service bandwidth signals to said test facility are blocked.

2. A circuit for interfacing between a DSL (Digital Subscriber Line), and a Public Switched Telephone Network (PSTN) and a data network, comprising:

a telephone network interface circuit comprising a POTS (Plain Old Telephone Service) Line Card, a Low-Pass Filter, and a blocking capacitor; and a data network interface circuit comprising a modem and a series capacitor;

wherein the POTS Line Card and Low-Pass Filter of said telephone network interface circuit are connected to one point on a Main Distributing Frame (MDF) connectable to a DSL line;

wherein a test access facility is connectable to said one position;

wherein said blocking capacitor and said data network interface circuit are connected to a second position on said Main Distributing Frame;

wherein a broadband test access facility is connectable to said second point of said MDF.

3. A circuit for interfacing between a DSL (Digital Subscriber Line), and a Public Switched Telephone Network (PSTN), and a Data Network comprising:

a telephone network interface circuit comprising a POTS (Plain Old Telephone Service) Line Card and a Low-Pass Filter; and a data network interface circuit, comprising a modem and a series capacitor;

wherein both the telephone network interface circuit and the data network interface circuit are connected to one point on a main distributing frame;

wherein a test facility is connectable to said one point on said Main Distributing Frame;

wherein direct current isolation is achieved between said test facility and said modem.

4. A circuit for interfacing between a DSL (Digital Subscriber Line), and a Public Switched Telephone Network (PSTN) and a data network, comprising:

a telephone network interface circuit comprising a POTS (Plain Old Telephone Service) Line Card and a Low-Pass Filter; and a data network interface circuit comprising a modem and two series capacitors;

wherein both the telephone network interface circuit and the data network are connected to one point on a Main Distributing Frame (MDF);

wherein a test access facility is connectable to said one point;

wherein a broadband test facility is connectable to a junction between said two series capacitors;

wherein direct current signals and POTS service bandwidth signals to said broadband facility are blocked.

* * * * *